United States Patent
Hsieh et al.

(10) Patent No.: US 9,725,552 B2
(45) Date of Patent: Aug. 8, 2017

(54) HMF-BASED PHENOL FORMALDEHYDE RESIN

(71) Applicant: INDUSTRIAL TECHNOLOGY RESEARCH INSTITUTE, Hsinchu (TW)

(72) Inventors: Cheng-Han Hsieh, Changhua (TW); Hung-Jie Liou, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/881,993

(22) Filed: Oct. 13, 2015

(65) Prior Publication Data

US 2016/0102165 A1    Apr. 14, 2016

Related U.S. Application Data

(60) Provisional application No. 62/063,607, filed on Oct. 14, 2014.

(51) Int. Cl.
*C08L 63/04* (2006.01)
*C08L 77/02* (2006.01)
*C08G 8/32* (2006.01)
*C09D 163/00* (2006.01)
*C08G 8/04* (2006.01)
*C08G 8/06* (2006.01)

(52) U.S. Cl.
CPC .......... *C08G 8/32* (2013.01); *C08G 8/04* (2013.01); *C08G 8/06* (2013.01); *C08L 63/04* (2013.01); *C08L 77/02* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 4,048,126 A | 9/1977 | Gibbons et al. | |
| 4,524,164 A | 6/1985 | Viswanathan et al. | |
| 4,714,734 A | 12/1987 | Hashimoto et al. | |
| 6,039,783 A | 3/2000 | Lueck et al. | |
| 6,641,638 B1 | 11/2003 | Lueck et al. | |
| 7,883,882 B2 | 2/2011 | Franklin et al. | |
| 7,935,515 B2 | 5/2011 | Franklin et al. | |
| 8,187,860 B2 | 5/2012 | Franklin et al. | |
| 8,222,010 B2 | 7/2012 | Franklin et al. | |
| 8,268,610 B2 | 9/2012 | Franklin et al. | |
| 8,435,767 B2 | 5/2013 | Franklin et al. | |
| 8,545,633 B2 | 10/2013 | Nguyen | |
| 8,674,180 B2 | 3/2014 | Franklin et al. | |
| 8,697,427 B2 | 4/2014 | Franklin et al. | |
| 8,772,515 B2 | 7/2014 | Dumesic et al. | |
| 2006/0165622 A1 | 7/2006 | Hiramoto et al. | |
| 2008/0125517 A1 | 5/2008 | Clingerman et al. | |
| 2008/0207795 A1 | 8/2008 | Henry et al. | |
| 2009/0163449 A1 | 6/2009 | Wempe | |
| 2010/0151112 A1 | 6/2010 | Franklin et al. | |
| 2010/0151538 A1 | 6/2010 | Franklin et al. | |
| 2010/0159082 A1 | 6/2010 | Rupasinghe et al. | |
| 2011/0203168 A1 | 8/2011 | Franklin et al. | |
| 2011/0262984 A1 | 10/2011 | Nguyen | |
| 2011/0282020 A1 | 11/2011 | Sipos | |
| 2013/0034883 A1 | 2/2013 | Soong et al. | |
| 2013/0052702 A1 | 2/2013 | Saunders et al. | |
| 2013/0089916 A1 | 4/2013 | Franklin et al. | |

(Continued)

FOREIGN PATENT DOCUMENTS

CN    1857527 A    11/2006
CN    1864693 A    11/2006

(Continued)

OTHER PUBLICATIONS

Taiwanese Office Action and Taiwanese Search Report, issued Sep. 10, 2016, for Taiwanese Application No. 104133477.
Christiansen et al., "Potential of carbohydrates for exterior-type adhesives", Forest, 1986, pp. 20-28.
Lee et al., "5-hydroxymethylfurfural as a potential monomer for the preparation of carbon aerogel", Materials Chemistry and Physics, vol. 136, 2012, pp. 837-844.
Zhang et al., "Effect of starch and lignin on physico-chemical properties of phenol-starch resin and its resin core sand", Starch/Stärke, vol. 65, 2013, pp. 666-678.

(Continued)

*Primary Examiner* — Ana Woodward
(74) *Attorney, Agent, or Firm* — Birch, Stewart, Kolasch & Birch, LLP

(57) ABSTRACT

A HMF-based phenol formaldehyde resin is provided. The HMF-based phenol formaldehyde resin has the formula

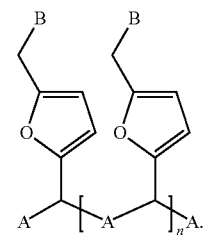

In the formula, A includes non-substituted phenol, m-cresol, p-cresol, hydroquinone or disubstituted phenol, B includes phosphate ester, phosphate, phosphine oxide, phosphinate ester or phosphinate, and n is 3-20, wherein the disubstituted phenol has substituted groups including H, halide, $C_1$-$C_{20}$ alkyl group, $C_1$-$C_{20}$ alkenyl group, $C_1$-$C_{20}$ cycloalkyl group, $C_1$-$C_{20}$ cycloalkenyl group, homocyclic aromatic group or heterocyclic aromatic group.

11 Claims, No Drawings

(56) References Cited

U.S. PATENT DOCUMENTS

| | | |
|---|---|---|
| 2013/0165677 A1 | 6/2013 | Franklin et al. |
| 2013/0211005 A1 | 8/2013 | Ludvik et al. |
| 2013/0273621 A1 | 10/2013 | Franklin et al. |
| 2013/0305598 A1 | 11/2013 | Hamilton et al. |
| 2014/0148560 A1 | 5/2014 | Qureshi et al. |
| 2014/0170713 A1 | 6/2014 | Retsina et al. |

FOREIGN PATENT DOCUMENTS

| | | | |
|---|---|---|---|
| CN | 1900694 | A | 1/2007 |
| CN | 2881605 | Y | 3/2007 |
| CN | 102372685 | A | 3/2012 |
| CN | 101851261 | B | 11/2012 |
| CN | 103313955 | A | 9/2013 |
| CN | 102520103 | B | 3/2014 |
| CN | 103820036 | A | 5/2014 |
| JP | 2003277457 | A * | 10/2003 |
| JP | 2010-126695 | A | 6/2010 |
| TW | 526065 | | 4/2003 |
| TW | 574267 | B | 2/2004 |
| TW | 200831119 | | 8/2008 |
| TW | 200902448 | | 1/2009 |
| TW | 200902661 | | 1/2009 |
| TW | 201217441 | A1 | 5/2012 |
| TW | 201231673 | A1 | 8/2012 |
| TW | 201231674 | A1 | 8/2012 |
| TW | 201235374 | A1 | 9/2012 |
| TW | 201302680 | A1 | 1/2013 |
| TW | I389996 | | 3/2013 |
| TW | 201323596 | A1 | 6/2013 |
| TW | 201326268 | A1 | 7/2013 |
| TW | I429696 | | 3/2014 |
| WO | 2012/162684 | A2 | 11/2012 |

OTHER PUBLICATIONS

Zhang et al., "Engineering Biomass into Formaldehyde-Free Phenolic Resin for Composite Materials", AIChE Journal, vol. 61, No. 4, Apr. 2015, pp. 1275-1283.

* cited by examiner

HMF-BASED PHENOL FORMALDEHYDE RESIN

CROSS REFERENCE TO RELATED APPLICATIONS

This application claims the benefit of U.S. Provisional Application No. 62/063,607, filed 14 Oct. 2014, the entirety of which is incorporated by reference herein.

TECHNICAL FIELD

The technical field relates to a HMF-based phenol formaldehyde resin.

BACKGROUND

A flame retardant is an important processing aid for the synthesis of polymer materials, and its demand is second only to plasticizers. Since halogen-based flame retardants easily generate toxic gas (for example, dioxin or furan) during a combustion process, use of the halogen-based flame retardants is currently forbidden by the European Union. Although nitrogen-based flame retardants (for example, melamine or cyanuric acid) and inorganic flame retardants such as aluminum hydroxide or magnesium hydroxide possess environmental characteristics, only the addition of a great quantity thereof can make the prepared material achieve a flame retarding effect. However, a heavy addition of inorganic flame retardants will decrease the mechanical characteristics of the prepared material itself and limit its use. In conclusion, although the flame retarding effect of phosphorus-based flame retardants is not as good as that of halogen-based flame retardants, the phosphorus-based flame retardants are safer than the halogen-based flame retardants and a heavy addition of the phosphorus-based flame retardants is not required, therefore, it is more in line with the current demand for a flame retardant with the characteristics of high efficiency, low smoke, low toxicity, and low addition amount.

Traditionally, there are two ways to adopt flame retardants to improve the flame retarding characteristic of the prepared material. One way is to directly add traditional flame retardants (for example, tricresyl phosphate, tetrabromobisphenol A, antimony trioxide, aluminum hydroxide, and red phosphorus, etc.) to mix with materials, and the advantage thereof is a lower cost and simple production process. However, the flame retarding effect is poor. The compatibility of the traditional flame retardants with resin and whether a heavy addition thereof affects the mechanical characteristics of the prepared material must be considered. The other way is to directly conduct the molecule with flame retarding properties into the resin, and the advantage thereof is to achieve a superior flame retarding effect. However, the cost of the modifier is generally high. Lastly, considering these factors comprehensively, the current trend is still to directly add flame retardants as the mainstream practice.

However, in consideration of a high-temperature manufacturing process of partial high-end products (for example, nylon or polyester composites) and use in a high-temperature environment (for example, aviation, car or electronic products), the heat resistance characteristics of flame retardants is a key factor for consideration. At the present stage, since the heat resistance characteristics of most phosphorus-based flame retardants are poor, available flame retardant of the above-mentioned material is rare, in addition, since most phosphorus-based flame retardants also have the disadvantage of a high water absorption rate, which often causes problems such as increasing the water absorption rate and decreasing the physical property and size stability of the prepared materials when adding the phosphorus-based flame retardants to materials. Therefore, the category of high-temperature and low-water-absorption phosphorus-based flame retardants is rare and expensive which dramatically increases the cost thereof. Although inorganic flame retardants (for example, aluminum hydroxide, magnesium hydroxide, etc.) are cheap, a heavy addition thereof is needed to achieve the desired effect, which tremendously affects the mechanical characteristics of the prepared material and also has the problem of increasing the water absorption rate thereof.

SUMMARY

One embodiment of the disclosure provides a HMF-based phenol formaldehyde resin having the following formula (I).

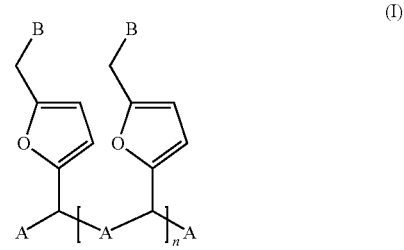

In formula (I), A comprises non-substituted phenol, m-cresol, p-cresol, hydroquinone or disubstituted phenol, B comprises phosphate ester, phosphate, phosphine oxide, phosphinate ester or phosphinate, and n is 3-20.

One embodiment of the disclosure provides a thermosetting resin composition comprising epoxy resin with 100 phr, a hardener with 42-57 phr and the disclosed HMF-based phenol formaldehyde resin with 10-20 phr.

One embodiment of the disclosure provides a thermoplastic resin composition comprising nylon with 100 phr, and the disclosed HMF-based phenol formaldehyde resin with 5-25 phr.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a HMF-based phenol formaldehyde resin having the following formula (I).

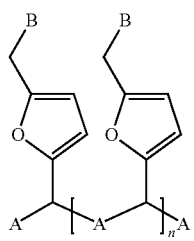 (I)

In formula (I), A may comprise non-substituted phenol, m-cresol, p-cresol, hydroquinone or disubstituted phenol, B may comprise phosphate ester, phosphate, phosphine oxide, phosphinate ester or phosphinate, and n may be 3-20.

In some embodiments, the disubstituted phenol has substituted groups selected from the group consisting of H, halide, $C_1$-$C_{20}$ alkyl group, $C_1$-$C_{20}$ alkenyl group, $C_1$-$C_{20}$ cycloalkyl group, $C_1$-$C_{20}$ cycloalkenyl group, homocyclic aromatic group and heterocyclic aromatic group.

In one embodiment, the phosphate ester has the following formulae:

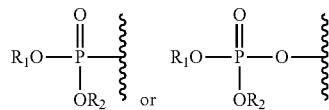

In the formula, $R_1$ and $R_2$ may be selected from the group consisting of aryl group, alkyl group and alkenyl group.

In some embodiments, the aryl group may comprise phenyl group and the alkyl group may comprise ethyl group or iso-propyl group.

In some embodiments, the phosphate ester may be diphenyl phosphate, ditolyl phosphate, dibenzyl phosphate, bis(3,5-dimethyl phenyl)phosphate ($R_1$=$R_2$=aryl group), dimethyl phosphate, diethyl phosphate, diisopropyl phosphate, dibutyl phosphate, di-tert-butyl phosphate or ethylene phosphate ($R_1$=$R_2$=alkyl group), diallyl phosphate ($R_1$=$R_2$=alkenyl group), or methyl phenyl phosphate, ethyl phenyl phosphate, isopropyl phenyl phosphate, butyl phenyl phosphate or tert-butyl phenyl phosphate ($R_1$, $R_2$=phenyl group and alkyl group).

In one embodiment, the phosphate has the following formulae:

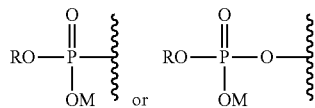

In the formulae, R may be selected from the group consisting of aryl group, alkyl group and alkenyl group, and M may be selected from the group consisting of lithium ion, sodium ion, calcium ion, potassium ion, cesium ion, magnesium ion, barium ion, aluminum ion, boron ion, ammonium ion and melamine.

In some embodiments, the aryl group may comprise phenyl group and the alkyl group may comprise ethyl group or iso-propyl group.

In some embodiments, the phosphate may be phenyl phosphate ammonium salt, tolyl phosphate ammonium salt, benzyl phosphate ammonium salt or 3,5-dimethyl phenyl phosphate ammonium salt (R=aryl group, M=ammonium ion), methyl phosphate ammonium salt, ethyl phosphate ammonium salt, isopropyl phosphate ammonium salt, butyl phosphate ammonium salt or tert-butyl phosphate ammonium salt (R=alkyl group, M=ammonium ion), or allyl phosphate ammonium salt (R=alkenyl group, M=ammonium ion).

In one embodiment, the phosphine oxide has the following formulae:

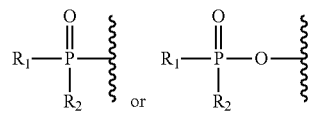

In the formula, $R_1$ and $R_2$ may be selected from the group consisting of aryl group, alkyl group and alkenyl group.

In some embodiments, the aryl group may comprise phenyl group and the alkyl group may comprise ethyl group or iso-propyl group.

In some embodiments, the phosphine oxide may be diphenyl phosphine oxide, ditolyl phosphine oxide, dibenzyl phosphine oxide or bis(3,5-dimethyl phenyl)phosphine oxide ($R_1$=$R_2$=aryl group), diisopropyl phosphine oxide, dibutyl phosphine oxide, di-tert-butyl phosphine oxide, dimethyl phosphine oxide or diethyl phosphine oxide ($R_1$=$R_2$=alkyl group), diallyl phosphine oxide ($R_1$=$R_2$=alkenyl group), or methyl phenyl phosphine oxide, ethyl phenyl phosphine oxide, isopropyl phenyl phosphine oxide, butyl phenyl phosphine oxide or tert-butyl phenyl phosphine oxide ($R_1$, $R_2$=phenyl group and alkyl group).

In one embodiment, the phosphinate ester has the following formulae:

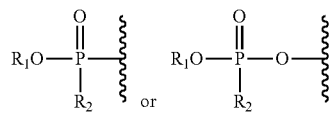

In the formula, $R_1$ and $R_2$ may be selected from the group consisting of aryl group, alkyl group and alkenyl group.

In some embodiments, the aryl group may comprise phenyl group and the alkyl group may comprise ethyl group or iso-propyl group.

In some embodiments, the phosphinate ester may be diphenyl phosphinate, ditolyl phosphinate, dibenzyl phosphinate or bis(3,5-dimethyl phenyl)phosphinate ($R_1$=$R_2$=aryl group), dimethyl phosphinate, diethyl phosphinate, diisopropyl phosphinate, dibutyl phosphinate or di-tert-butyl phosphinate ($R_1$=$R_2$=alkyl group), diallyl phosphinate ($R_1$=$R_2$=alkenyl group), or methyl phenyl phosphinate, ethyl phenyl phosphinate, isopropyl phenyl phosphinate, butyl phenyl phosphinate or tert-butyl phenyl phosphinate ($R_1$, $R_2$=phenyl group and alkyl group).

In one embodiment, the phosphinate has the following formulae:

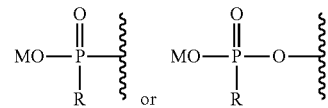

In the formula, R may be selected from the group consisting of aryl group, alkyl group and alkenyl group, and M may be selected from the group consisting of lithium ion, sodium ion, calcium ion, potassium ion, cesium ion, magnesium ion, barium ion, aluminum ion, boron ion, ammonium ion and melamine.

In some embodiments, the aryl group may comprise phenyl group and the alkyl group may comprise ethyl group or iso-propyl group.

In some embodiments, the phosphinate may be phenyl phosphinic acid ammonium salt, tolyl phosphinic acid ammonium salt, benzyl phosphinic acid ammonium salt or 3,5-dimethyl phenyl phosphinic acid ammonium salt (R=aryl group, M=ammonium ion), methyl phosphinic acid ammonium salt, ethyl phosphinic acid ammonium salt, isopropyl phosphinic acid ammonium salt, butyl phosphinic acid ammonium salt or tert-butyl phosphinic acid ammonium salt (R=alkyl group, M=ammonium ion), or allyl phosphinic acid ammonium salt (R=alkenyl group, M=ammonium ion).

The disclosure discloses the development of a low-water-absorption and high-heat-resistance phosphorus-based HMF-based phenol formaldehyde resin flame retardant, replacing the use of formaldehyde by a biomass material, introducing various phosphorus-based groups with flame retarding properties to develop biomass-derived flame retarding materials through a functional modification technique, in the meantime, adopting the aldehyde structure of HMF to replace formaldehyde and react with phenol to prepare a high-flame-retarding phenol formaldehyde resin. It is capable of reducing the volatilization of formaldehyde in preparation of traditional phenol formaldehyde resin. The main preparation method of HMF is a biomass hydrolysis, which is capable of contributing to a decrease in the cost due to a rich source of raw materials and low price. Combining the advantage of the high heat resistance characteristics of phenol formaldehyde resin produces the phenol formaldehyde resin with high heat resistance characteristic and flame retarding effect. The disclosure also introduces the carbon-carbon bonding with a lower water absorption rate to ease the problem of high water absorption rate by the traditional phosphorus-based flame retardants. It is capable of applying to the original field where traditional phenol formaldehyde resin used to be applied, it is capable of being used as a high-heat-resistance flame retardant applied to engineering plastics requiring high-temperature processing, or for use in high-temperature environments, expecting to develop general-purpose-type functional specialty chemical materials.

The preparation including two synthesis pathways of the present HMF-based phenol formaldehyde resin is disclosed as follows.

Synthesis Pathway (1):

A specific amount of phenol, m-cresol, p-cresol, hydroquinone or disubstituted phenol, for example, 3,4-dimethyl phenol, 3,5-dimethyl phenol, 3-ethyl-5-methyl phenol is added to a reaction flask. A specific amount of HMF and an alkaline catalyst, for example, NaOH, KOH or K$_2$CO$_3$ are then added to the reaction flask and heated to, for example, 110° C.-125° C. to react for an appropriate period of time. After the reaction is completed, the reaction flask is kept at, for example, 80-140° C. Water produced from the reaction and unreacted phenol, m-cresol, p-cresol, hydroquinone or disubstituted phenol are then removed to obtain a solution by vacuum at 20-80 torr. The solution is then anti-solvent precipitation by methanol/water and filtered to obtain a solid. The solid is then washed with deionized water several times. After drying, the present HMF-based phenol formaldehyde resin (PHMF) is obtained.

A specific amount of PHMF is added to a reaction flask and dissolved with N,N-dimethylacetamide (DMAc) and trimethylamine (Et$_3$N). Next, a specific amount of phosphate ester, for example, diphenyl chlorophosphate

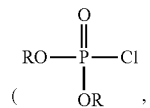

R=aryl group), diethyl chlorophosphate

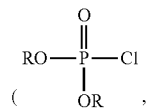

R=alkyl group) or divinyl chlorophosphate

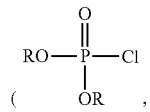

R=alkenyl group) is slowly added to the reaction flask to react at, for example, room temperature. The reaction temperature is controlled to remain lower than, for example, 25° C. until the addition of phosphate ester or phosphate is completed. The reaction flask is then heated to, for example, 60° C. to react for about 3 to 6 hours to obtain a solution. After the reaction is completed, the solution is poured into water and then filtered to obtain the solid. The solid is then washed with deionized water several times. After drying, the present phosphorus HMF-based phenol formaldehyde resin (phosphate ester-HMF) is obtained.

Synthesis Pathway (2):

A specific amount of phenol, m-cresol, p-cresol, hydroquinone or disubstituted phenol, for example, 3,4-dimethyl phenol, 3,5-dimethyl phenol, 3-ethyl-5-methyl phenol is added to a reaction flask. A specific amount of HMF and an alkaline catalyst, for example, NaOH, KOH or K$_2$CO$_3$ are then added to the reaction flask and heated to, for example, 110° C.-125° C. to react for an appropriate period of time. After the reaction is completed, the reaction flask is cooled to, for example, 80° C. Water produced from the reaction and unreacted phenol, m-cresol, p-cresol, hydroquinone or disubstituted phenol are then removed to obtain a solution by vacuum at 20-80 torr. The solution is then anti-solvent precipitation by methanol/water and filtered to obtain a solid. The solid is then washed with deionized water several times. After drying, a HMF-based phenol formaldehyde resin (PHMF) is obtained.

PHMF is added to a reaction flask and dissolved with DMAc. A specific amount of chlorophosphine, for example, diphenyl chlorophosphine, bis(4-methylphenyl)chlorophosphine, chlorodi(o-tolyl)phosphine, bis(2,4,6-trimethylphenyl)phosphorus chloride

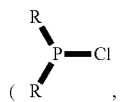

R=aryl group), diethyl chlorophosphine, di-iso-propyl chlorophosphine, di-tert-butylchlorophosphine, chlorodicyclopentylphosphine, chlorodicyclohexylphosphine

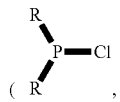

R=alkyl group) or divinyl chlorophosphate

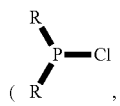

R=alkenyl group) is slowly added to the reaction flask to react at, for example, room temperature. The reaction temperature is controlled to remain lower than, for example, 25° C. until the addition of phosphine is completed. The reaction flask is then heated to, for example, 65° C. to react for about 3 to 4 hours, then cooled down to for example, 50° C. 20% NaOH aqueous solution and tetrabutylammonium bromide are then added into the reaction flask, the temperature again being heated to obtain a solution. After the reaction is completed, the solution is poured into water and filtered to for example, 75° C. for another 1.5 to 2 hours. After the reaction is completed, the solution is poured into 1N HCl and filtered to obtain a solid. The solid is then washed with deionized water several times. After drying, the present phosphorus HMF-based phenol formaldehyde resin (phosphine oxide-HMF) is obtained.

EXAMPLES

Example 1

The Preparation of the Present HMF-Based Phenol Formaldehyde Resin (1) (Main Chain: Phenol, Side Chain: Diethyl Phosphate (Phosphate Ester)) (PHMF-DEP)

10 g of phenol was added to a reaction flask. 13.4 g of HMF, 2 g of alkaline catalyst, and weight of 50% $NaOH_{(aq)}$ were then added to the reaction flask and heated to 110° C. to react for an appropriate period of time. After the reaction was completed, the reaction flask was cooled to 80° C. Water produced from the reaction and unreacted phenol were then removed to obtain a solution by vacuum at 20 torr. The solution was then anti-solvent precipitation by methanol/water and filtered to obtain a solid. The solid was then washed with deionized water several times. After drying, 20 g of HMF-based phenol formaldehyde resin (PHMF) was obtained.

First, 4 g of PHMF was added to a reaction flask and dissolve with 15 ml of DMAc and 5 ml of $Et_3N$. Next, 2.9 ml of diethyl chlorophophate

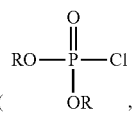

R=alkyl group) (phosphate ester) was slowly added to the reaction flask to react at room temperature. The reaction temperature is controlled to remain at 25° C. until the addition of chlorophophate is completed. The reaction flask is then heated to, 60° C. to react for about 3 to 6 hours to obtain a solution. After the reaction is completed, the solution is poured into water and filtered to obtain the solid. The solid is then washed with deionized water several times. After drying, 6.2 g phosphorus HMF-based phenol formaldehyde resin is obtained.

$^{31}$P NMR δ–13.42 ppm.

Thermal stability (TGA on-set) of the present HMF-based phenol formaldehyde resin (1) (main chain: phenol, side chain: diethyl phosphate (phosphate ester)) were tested.

Example 2

The Preparation of the Present HMF-Based Phenol Formaldehyde Resin (2) (Main Chain: Phenol, Side Chain: Diphenyl Phosphate (Phosphate Ester)) (PHMF-DPP)

10 g of phenol was added to a reaction flask. 13.4 g of HMF, 2 g of alkaline catalyst, and 50% NaOH aqueous solution as catalyst were then added to the reaction flask and heated to 110° C. to react for an appropriate period. After the reaction was completed, the reaction flask was cooled to 80° C. Water produced from the reaction and unreacted phenol were then removed to obtain a solution by vacuum at 20 torr. The solution was then anti-solvent precipitation by methanol/water and filtered to obtain a solid. The solid was then washed with deionized water several times. After drying, 20 g of HMF-based phenol formaldehyde resin (PHMF) was obtained.

First, 2 g of PHMF was added to a reaction flask and dissolve with 15 ml of DMAc and 5 ml of $Et_3N$. Next, 2.3 ml of diphenyl chlorophophate

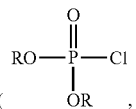

R=aryl group) (phosphate ester) was slowly added to the reaction flask to react at room temperature. The reaction temperature is controlled to remain at 25° C. until the addition of chlorophosphate is completed. The reaction flask is then heated to, 60° C. to react for about 3 to 6 hours to obtain a solution. After the reaction is completed, the solution is poured into water and filtered to obtain the solid. The solid is then washed with deionized water several times. After drying, 3.9 g phosphorus HMF-based phenol formaldehyde resin is obtained.

$^{31}$P NMR δ–10.95 ppm.

Thermal stability (TGA-on set) of the present HMF-based phenol formaldehyde resin (2) (main chain: phenol, side chain: diphenyl phosphate (phosphate ester)) were tested.

Example 3

The Preparation of the Present HMF-Based Phenol Formaldehyde Resin (3) (Main Chain: Phenol, Side Chain: Diphenyl Phosphine Oxide (Phosphine Oxide)) (PHMF-DPPi)

10 g of phenol was added to a reaction flask. 13.4 g of HMF, 2 g of alkaline catalyst, and 50% NaOH aqueous solution as catalyst were then added to the reaction flask and heated to 110° C. to react for an appropriate period. After the reaction was completed, the reaction flask was cooled to 80° C. Water produced from the reaction and unreacted phenol were then removed to obtain a solution by vacuum at 20 torr. The solution was then anti-solvent precipitation by methanol/water and filtered to obtain a solid. The solid was then washed with deionized water several times. After drying, 20 g of HMF-based phenol formaldehyde resin (PHMF) was obtained.

First, 4 g of PHMF was added to a reaction flask and dissolve with 15 ml of DMAc and 5 ml of Et₃N. Next, 3.8 ml of diphenyl chlorophosphine oxide

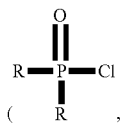

R=aryl group) (phosphine oxide) was slowly added to the reaction flask to react at room temperature. The reaction temperature is controlled to remain at 25° C. until the addition of chlorophosphine oxide is completed. The reaction flask is then heated to, 60° C. to react for about 3 to 6 hours to obtain a solution. After the reaction is completed, the solution is poured into water and filtered to obtain a solid. The solid is then washed with deionized water several times. After drying, 7.5 g phosphorus HMF-based phenol formaldehyde resin is obtained.

$^{31}$P NMR δ 23.24 ppm.

Thermal stability (TGA on-set) of the present HMF-based phenol formaldehyde resin (3) (main chain: phenol, side chain: diphenyl phosphine oxide (phosphine oxide)) were tested.

Example 4

The Preparation of the Present HMF-Based Phenol Formaldehyde Resin (4) (Main Chain: Phenol, Side Chain: Di-Iso-Propylphosphine Oxide) (PMF-DiPPi)

10 g of phenol was added to a reaction flask. 13.4 g of HMF, 2 g of alkaline catalyst, and 50% NaOH aqueous solution as catalyst were then added to the reaction flask and heated to 110° C. to react for an appropriate period. After the reaction was completed, the reaction flask was cooled to 80° C. Water produced from the reaction and unreacted phenol were then removed to obtain a solution by vacuum at 20 torr. The solution was then anti-solvent precipitation by methanol/water and filtered to obtain a solid. The solid was then washed with deionized water several times. After drying, 20 g of HMF-based phenol formaldehyde resin (PHMF) was obtained.

4 g of PHMF is added to a reaction flask and dissolve with 50 ml of DMAc. 3.5 ml of di-iso-propylcholophosphine

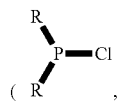

R=alkyl group) is slowly added to the reaction to react at, for example, room temperature. The reaction temperature is controlled to remain lower than, for example, 25° C. until the addition of chlorophophine is completed. The reaction flask is then heated to, for example, 65° C. to react for about 3 to 4 hours, then cooled to for example, 50° C. 8 g of 20% NaOH aqueous solution and 670 mg of tetrabutylammonium bromide are added into reaction flask, the temperature again being heated to obtain a solution. After the reaction is completed, the solution is poured into water and filtered to for example, 75° C. for another 1.5 to 2 hours. After the reaction is completed, the solution is poured into 250 ml 1N HCl and filtered to obtain a solid. The solid is then washed by deionized water several times. After drying, 6.8 g phosphorus HMF-based phenol formaldehyde resin (phosphine oxide-HMF) is obtained.

$^{31}$P NMR δ 53.89 ppm.

Thermal stability (TGA-on set) of the present HMF-based phenol formaldehyde resin (4) (main chain: phenol, side chain: di-iso-propylphosphine oxide) were tested.

Example 5

The Preparation of the Present HMF-Based Phenol Formaldehyde Resin (5) (Main Chain: Phenol, Side Chain: Diphenylphosphine Oxide) (PMF-DPPi)

10 g of phenol was added to a reaction flask. 13.4 g of HMF, 2 g of alkaline catalyst, and 50% NaOH aqueous solution as catalyst were then added to the reaction flask and heated to 110° C. to react for an appropriate period. After the reaction was completed, the reaction flask was cooled to 80° C. Water produced from the reaction and unreacted phenol were then removed to obtain a solution by vacuum at 20 torr. The solution was then anti-solvent precipitation by methanol/water and filtered to obtain a solid. The solid was then washed with deionized water several times. After drying, 20 g of HMF-based phenol formaldehyde resin (PHMF) was obtained.

4 g of PHMF is added to a reaction flask and dissolve with 50 ml of DMAc. 3.9 ml of diphenylchlorophosphine

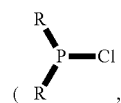

R=aryl group) is slowly added to the reaction to react at, for example, room temperature. The reaction temperature is controlled to remain lower than, for example, 25° C. until the addition of chlorophosphine is completed. The reaction flask is then heated to, for example, 65° C. to react for about 3 to 4 hours, then cooled to for example, 50° C. 8 g of 20% NaOH aqueous solution and 670 mg of tetrabutylammonium bromide are added into the reaction flask, the temperature again being heated to obtain a solution. After the reaction is completed, the solution is poured into water and filtered to for example, 75° C. for another 1.5 to 2 hours. After the reaction is completed, the solution is poured into 250 ml 1N HCl and filtered to obtain a solid. The solid is then washed with deionized water several times. After drying, 8.1 g phosphorus HMF-based phenol formaldehyde resin (phosphine oxide-HMF) is obtained.

$^{31}$P NMR δ 23.22 ppm.

Thermal stability (TGA-on set) of the present HMF-based phenol formaldehyde resin (5) (main chain: phenol, side chain: diphenylphosphine oxide) were tested.

Example 6

Thermal Stability Test

Thermal stability studies were carried out on a Mettler TGA/SDTA851 with air as a purge gas at scan rates of 10° C./min. The thermal stability of the present HMF-based phenol formaldehyde resins (PHMF-DEP (prepared by Example 1), PHMF-DPP (prepared by Example 2), PHMF-DPPi (prepared by Example 3), PMF-DiPPi (prepared by Example 4) and PMF-DPPi (prepared by Example 5) was shown in Table 1.

TABLE 1

| HMF-based phenol formaldehyde resins | On-set | Td 2% | Td 5% |
|---|---|---|---|
| PHMF-DEP | 214° C. | 215° C. | 261° C. |
| PHMF-DPP | 244° C. | 242° C. | 281° C. |
| PHMF-DPPi | 248° C. | 250° C. | 293° C. |
| PMF-DiPPi | 262° C. | 260° C. | 291° C. |
| PMF-DPPi | 270° C. | 280° C. | 311° C. |

Example 7

The Preparation of the Present Thermosetting Resin Composition (Epoxy Resin/HMF-Based Phenol Formaldehyde Resin (Prepared by Example 2 and Example 5))

As shown in Table 2, Novolac epoxy resin (NPCN-704, purchased from Nan Ya Plastics Corporation), epoxy resin (EPICLON HP 7200H, purchased from DIC Corporation), a commercial flame retardant (KFR-DOPO, purchased from Kuo Ching Chemical Corporation) and phosphorus HMF-based phenol formaldehyde resin (prepared by Example 2/Example 5) were mixed to form a flame retardant material.

A piece of glass fabric (7628, purchased from Nan Ya Plastics Corporation) was impregnated with the formed flame retardant material (impregnated amount: about 45-55%). The impregnated glass fabric was then baked in a hot air circulation oven at 170° C. for several minutes. The crosslinking reaction ratio was controlled to about 50% and a film was obtained.

After the five films were laminated together, a piece of Teflon release cloth, a lens plate, and a piece of kraft paper were each put on the top and on bottom of the laminated five-films and placed in a vacuum laminator press and hot-pressed at 200-230° C. for 2 hr. A flame retardant laminate with thickness of 1.0+0.05 mm was obtained. The Teflon release cloth was replaced by a copper foil to form a copper clad laminate.

The flame resistance (UL94) and thermostability (Tg) of the present thermosetting resin composition (epoxy resin/HMF-based phenol formaldehyde resin) was tested and shown in Table 2.

TABLE 2

| Matrix | Hardener (phr) | DOPO (phr) | PHMF-DPP (phr) | PMF-DPPi (phr) | Tg-TMA (° C.) | UL-94 |
|---|---|---|---|---|---|---|
| Epoxy resin | 54 | 30 | — | — | 148 | V0 |
| | 47 | 20 | 10 | — | 161 | V0 |
| | 47 | 20 | — | 10 | 152 | V0 |
| | 42 | 10 | — | 20 | 166 | V0 |

Example 8

The Preparation of the Present Thermoplastic Resin Composition (Nylon/HMF-Based Phenol Formaldehyde Resin (Prepared by Example 5))

As shown in Table 3, Nylon 6 (purchased from Chiao Fu Enterprise Corporation) and phosphorus HMF-based phenol formaldehyde resin (prepared by Example 5) were mixed in a Brabender and then a hot-pressing is performed.

The day before the experiment, Nylon and the HMF-based phenol formaldehyde resin were dried in an oven (80° C.) to remove water. In the experiment, the conditions of the Brabender were set (temperature: 235° C., kneading time: 5 minutes, speed: 70 rpm). After mixing in the Brabender, the specimen was hot-pressed. Before the hot-pressing, the specimen was dried in an oven (80° C.) for one hour to remove water. Before the hot-pressing, the hot-pressing machine was preheated for 5 minutes. The temperature of the hot-pressing was set at 240° C. The time of the hot-pressing was set for 8 minutes. After the hot-pressing and cooling, a product is obtained. The size of the product was 12.5 cm*1.3 cm*0.3 cm.

The flame resistance of the present thermoplastic resin composition (nylon/HMF-based phenol formaldehyde resin) was tested and shown in Table 3.

TABLE 3

| Matrix | PMF-DPPi (phr) | Phosphorous content (%) | LOI | T1 + T2 (sec) | Carbon yield (%) |
|---|---|---|---|---|---|
| Nylon | 0 | 0 | 24 | 12 | 0 |
| | 15 | 1.0 | 28 | 9.7 | 2.63 |
| | 25 | 1.5 | 29 | 9.3 | 5.79 |

Example 9

Water Absorption Test

The water absorption of the present thermoplastic resin composition (nylon/HMF-based phenol formaldehyde resin (prepared by Example 5)) was tested by ASTM D570 standard test method at room temperature for 24 hr or at 100° C. for 2 hr, respectively, and shown in Tables 4 and 5.

TABLE 4

| Matrix | HMF-based phenol formaldehyde resin (phr) | Water absorption (at room temperature, 24 hr) |
|---|---|---|
| Nylon | 0 | 2.5% |
| | 5 | 2.2% |
| | 15 | 2.2% |
| | 25 | 2.1% |

TABLE 5

| Matrix | PMF-DPPi (phr) | Water absorption (at 100° C., 2 hr) |
|---|---|---|
| Nylon | 0 | 3.12% |
| | 15 | 2.85% |

The disclosure discloses the development of a low-water-absorption and high-heat-resistance phosphorus-based HMF-based phenol formaldehyde resin flame retardant, replacing the use of formaldehyde by a biomass material, introducing various phosphorus-based groups with flame retarding properties to develop biomass-derived flame retarding materials through a functional modification technique, in the meantime, adopting the aldehyde structure of HMF to replace formaldehyde and react with phenol to prepare a high-flame-retarding phenol formaldehyde resin. It is capable of reducing the volatilization of formaldehyde in preparation of traditional phenol formaldehyde resin. The main preparation method of HMF is a biomass hydrolysis, which is capable of contributing to a decrease in the cost due to a rich source of raw materials and low price. Combining the advantage of the high heat resistance characteristics of phenol formaldehyde resin produces the phenol formaldehyde resin with high heat resistance characteristic and flame retarding effect. The disclosure also introduces the carbon-carbon bonding with a lower water absorption rate to ease the problem of high water absorption rate by the traditional phosphorus-based flame retardants. It is capable of applying to the original field where traditional phenol formaldehyde resin used to be applied, it is capable of being used as a high-heat-resistance flame retardant applied to engineering plastics requiring high-temperature processing, or for use in high-temperature environments, expecting to develop general-purpose-type functional specialty chemical materials.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A hydroxymethylfurfural-based phenol formaldehyde resin having the following formula (I):

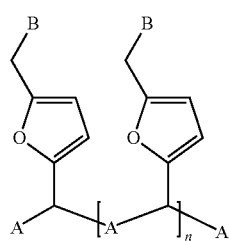

(I)

wherein

A comprises non-substituted phenol, m-cresol, p-cresol, hydroquinone or disubstituted phenol, wherein the disubstituted phenol has substituted groups selected from the group consisting of halide, $C_1$-$C_{20}$ alkyl group, $C_1$-$C_{20}$ alkenyl group, $C_1$-$C_{20}$ cycloalkyl group, $C_1$-$C_{20}$ cycloalkenyl group, homocyclic aromatic group and heterocyclic aromatic group, B comprises phosphate ester, phosphate, phosphine oxide, phosphinate ester or phosphinate, and n is 3-20.

2. The hydroxymethylfurfural-based phenol formaldehyde resin as claimed in claim 1, wherein the phosphate ester has the following formulae:

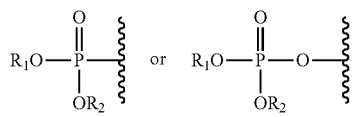

wherein $R_1$ and $R_2$ are selected from the group consisting of aryl group, alkyl group and alkenyl group.

3. The hydroxymethylfurfural-based phenol formaldehyde resin as claimed in claim 2, wherein the aryl group comprises phenyl group and the alkyl group comprises ethyl group or iso-propyl group.

4. The hydroxymethylfurfural-based phenol formaldehyde resin as claimed in claim 1, wherein the phosphate has the following formulae:

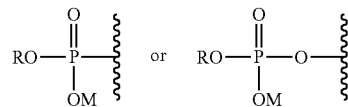

wherein

R is selected from the group consisting of aryl group, alkyl group and alkenyl group, and M is selected from the group consisting of lithium ion, sodium ion, calcium ion, potassium ion, cesium ion, magnesium ion, barium ion, aluminum ion, boron ion, ammonium ion and melamine.

5. The hydroxymethylfurfural-based phenol formaldehyde resin as claimed in claim 4, wherein the aryl group comprises phenyl group and the alkyl group comprises ethyl group or iso-propyl group.

6. The hydroxymethylfurfural-based phenol formaldehyde resin as claimed in claim 1, wherein the phosphine oxide has the following formulae:

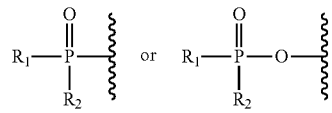

wherein $R_1$ and $R_2$ are selected from the group consisting of aryl group, alkyl group and alkenyl group.

7. The hydroxymethylfurfural-based phenol formaldehyde resin as claimed in claim 6, wherein the aryl group comprises phenyl group and the alkyl group comprises ethyl group or iso-propyl group.

8. The hydroxymethylfurfural-based phenol formaldehyde resin as claimed in claim 1, wherein the phosphinate ester has the following formulae:

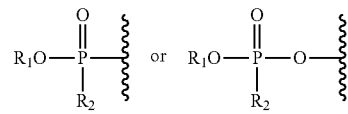

wherein $R_1$ and $R_2$ are selected from the group consisting of aryl group, alkyl group and alkenyl group.

9. The hydroxymethylfurfural-based phenol formaldehyde resin as claimed in claim 8, wherein the aryl group comprises phenyl group and the alkyl group comprises ethyl group or iso-propyl group.

10. The hydroxymethylfurfural-based phenol formaldehyde resin as claimed in claim 1, wherein the phosphinate has the following formulae:

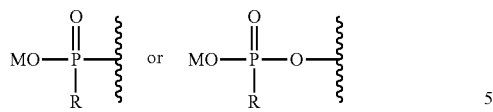

wherein
R is selected from the group consisting of aryl group, alkyl group and alkenyl group, and
M is selected from the group consisting of lithium ion, sodium ion, calcium ion, potassium ion, cesium ion, magnesium ion, barium ion, aluminum ion, boron ion, ammonium ion and melamine.

11. The hydroxymethylfurfural-based phenol formaldehyde resin as claimed in claim 10, wherein the aryl group comprises phenyl group and the alkyl group comprises ethyl group or iso-propyl group.

* * * * *